UNITED STATES PATENT OFFICE.

JOHN SEARLE, OF SAN FRANCISCO, CALIFORNIA.

IMPROVED PROCESS OF IMPARTING AGE TO WINES.

Specification forming part of Letters Patent No. 48,728, dated July 11, 1865; antedated June 15, 1865.

*To all whom it may concern:*

Be it known that I, JOHN SEARLE, of the city and county of San Francisco, State of California, have invented a new and Improved Process for Imparting Age to Wines and Liquors; and I do hereby declare that the within is a full and exact description of the same.

The nature of my invention consists in providing a process for shortening the time that is now required for ripening wines and liquors to about one-half the period without deteriorating their flavor by the use of steam. Madeira, sherry, port, Teneriffe and other wines have been prepared for many years for imparting age through the medium of "estufas," or large ovens having flues, by which they are heated. These estufas are filled with wines and spirits in casks or pipes, and are kept at a proper heat until the contents of the casks show the desired age through the staves. By this process the heat must necessarily be very great—say 140°—which impairs the flavor of the wine by imparting to it the taste of the cask; and oftentimes the casks have to be taken out and recoopered before the process can be completed.

By the use of my process the following advantages are derived:

First, there is a great saving of time and fuel, the building and air not being heated within, as by the old process.

Second, it can be effected in casks of the largest size, thereby insuring uniformity of quality in the wine.

Third, the process can be carried on in any store-house or cellar.

Fourth, there is no injury to the casks, whereas by the old system they become damaged and require constant repairs.

Fifth, the breakage and loss on the liquors are very much reduced, which is sometimes excessive in the estufas by the falling to pieces of the heated and dried-up casks.

Sixth, no bad taste is imparted to the liquors during my process, which is too often the case in the estufas, where the wine receives the heat through the sides of the cask.

To enable others skilled in the art to make and use my improvement, I will proceed to describe my process and its operation.

I use casks or tanks, as the case may be, for holding the wine. If casks, they may be placed on end. Through each of these casks or tanks, near the base, I pass an iron or metallic pipe (copper is preferable) of about one inch, and open at its end. These pipes connect with a main steam-pipe, and can be closed and the steam shut off, should the heat become too great for the wine, by means of a stop-cock attached to each of the pipes.

The degrees of heat which I use in this operation varies from 100° to 140°. The time required to perfect the operation of ripening wine by this process is about six weeks, yet, of course, it will be left to the knowledge and discretion of the keeper of the cellar to determine when the ripening process is completed.

Having thus described my invention, what I claim, and desire to secure by Letters Patent, is—

The introducing the heat by steam or otherwise to the wine itself by means of metallic pipes or chambers passing through the casks or vessel, substantially as set forth.

JOHN SEARLE.

Witnesses:
C. W. M. SMITH,
H. S. HOMANS.